(No Model.)
J. BURKE.
METHOD OF TRANSFERRING FEEDERS.
No. 554,239. Patented Feb. 11, 1896.
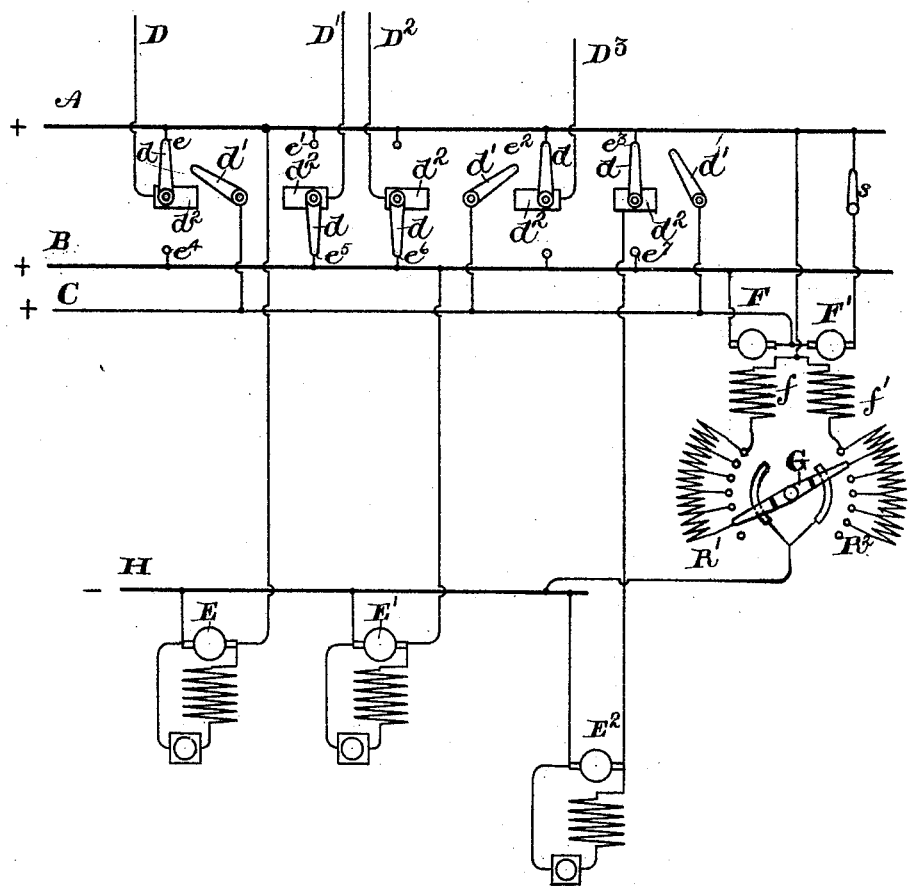
WITNESSES —
A. F. Macdonald.
J. J. Johnston.
INVENTOR —
James Burke, by
Geo. R. Blodgett,
Atty.

United States Patent Office.

JAMES BURKE, OF SCHENECTADY, NEW YORK, ASSIGNOR TO THE THOMSON-HOUSTON ELECTRIC COMPANY, OF BOSTON, MASSACHUSETTS.

METHOD OF TRANSFERRING FEEDERS.

SPECIFICATION forming part of Letters Patent No. 554,239, dated February 11, 1896.

Application filed December 24, 1894. Renewed January 6, 1896. Serial No. 574,560. (No model.)

*To all whom it may concern:*

Be it known that I, JAMES BURKE, a subject of the Queen of Great Britain, residing at Schenectady, in the county of Schenectady, State of New York, have invented certain new and useful Improvements in Methods of Transferring Feeders, of which the following is a specification.

In an application for patent recently filed I have described and claimed a method of regulating the potential in an electric circuit between extremes, consisting in general of introducing between the sources of supply of such different potential variable electromotive forces which serve to control the potential in the regulated circuit by reducing the voltage of the source of supply of higher potential and correspondingly raising the voltage of the source of lower potential.

The present invention consists of a further application of this same general idea, whereby feeders or any desired electrical apparatus may be transferred from a circuit of one potential to another in a satisfactory manner.

The invention is capable of many useful applications; but I have designed it particularly for the purpose of transferring feeders or generators in a central-station distribution system from one bus-bar to another.

In transferring feeders heretofore it has been customary to disconnect the feeders from the first bus-bar and then connect them to the second by quick-throw switches; but even when this is done as rapidly as possible it causes the potential at the end of the feeder and in the system of distribution connected therewith to fall rapidly and then rise again, in the case of lamps making an unpleasant flicker, and in the case of motors making a jerk as the current goes off and on. Similar difficulties have been experienced in transferring generators from one bus-bar to another. My invention avoids all these difficulties, since there is no break in the circuit; but the potential on the feeder to be transferred is gradually changed to that of the bus-bar to which it is to be coupled, so that the change creates no shock or spark.

In the accompanying drawing is illustrated diagrammatically a central-station plant embodying the invention.

The main generators E E', which are shown shunt-wound, have their positive terminals connected respectively to bus-bars A B, and their negative terminals are connected to the negative bus-bar H. Feeders D D' D² D³ are shown connected to the different bus-bars, and a series of switches $d$, which co-operate with contacts $e\ e'$, &c., are provided for transferring the feeders from one to the other of the bus-bars. Any suitable arrangement of switches may be used, and that shown in the drawing will be readily apparent.

A pair of auxiliary dynamos have their armatures F F' connected in series across the bus-bars A B, and an intermediate or auxiliary bus C is coupled to a point between the armatures, as indicated. The fields $f\ f'$ of the dynamos may be excited in any suitable manner, and for that purpose I have shown them connected in multiple between the bus-bar A and the negative bus H. Resistances R' R² are included, respectively, in the field-circuits of the two machines, and a contact-arm G is so arranged as to control the resistances inversely by cutting one out when the other is cut into circuit, and preferably in the extreme positions of the arm the circuit of one or the other of the field-coils is wholly broken. Switches $d'$ are connected to bus C, and a switch $s$ is provided for opening the circuit of the armatures F F' when desired. The switches $d'$ are so arranged as to make contact in one position with the contacts $d^2$, which are in electrical connection, respectively, with the different feeders.

The mode of operation of the invention as thus far described is as follows: Assume, for illustration, that a potential of one hundred and forty volts is normally maintained on the bus A and one hundred and twenty volts on the bus B, and that it is desired to transfer the feeder D from A to B. The rheostat-arm G will be thrown to the right so as to introduce a maximum amount of resistance in the circuit of $f'$ or, preferably, to break the circuit altogether. The machine F' will then run idle. There will be substantially no difference of potential between its terminals, and the potential of the bus C will be the same as that of A. Under these circumstances the field strength of the second machine will be a maximum, and it will absorb the total normal difference of potential between the bars A B. The switch $d'$ may then be closed and the switch $d$ opened. The feeder D will then be connected with both generators E E' through the armatures F' F, respectively; but, as already explained, the potential on the bar C will be substantially that of the generator E. Then by throwing the rheostat-arm G to the left resistance will be cut out of the field-circuit $f'$ and introduced into the circuit $f$, so that the potential on the bus-bar C will be correspondingly changed, until finally at the last position the bars B and C become of substantially equal potential when the machines F F' have reversed their functions, the machine F now running idle. Having thus brought the potential on the feeder C equal to that on the bar B, the switch $d$ may be thrown so as to contact with $e^1$ and thus complete the transfer, switch $d'$ being opened. The feeders may be transferred from bar B to A in a similar manner, as will be readily understood by electrical engineers. The generator $E^2$ is shown to indicate how a generator as well as a feeder may be transferred. Its positive terminal is connected to one of the contacts $d^2$, and, as shown in the drawing, the machine is coupled to the bar A by switch $d$.

If it is desired to transfer the machine to the bus B, switches $d\,d'$ will be thrown as before, when the potential on the bus-bar C is substantially the same as that on A. The generator will then be coupled to both bus-bars and may supply current to both bus-bars, though the potential of the current is so modified by the machines F F' that it corresponds with the potential generated by the other dynamos E E'. By properly adjusting the rheostat-arm G the potential of the bar C is made to correspond with bar B when the transfer is effected.

If desired, the generator $E^2$ may be used as a reserve machine and regularly coupled, when needed, to both bus-bars, so as to help out both sets of the regular machines, since the current delivered by the machine $E^2$ to the different feeders will be of the proper potential, owing to the modifying effect of the machines F F'.

What I claim as new, and desire to secure by Letters Patent of the United States, is—

1. The method of transferring electrical apparatus from a circuit at one potential to a different circuit at another potential, consisting in connecting the apparatus to both circuits through intermediate variable sources of electromotive force, and regulating the values of the intermediate electromotive forces simultaneously and inversely until the potential in the circuit of the apparatus to be transferred becomes substantially that of the circuit to which the transfer is to be made, and then completing the transfer, as set forth.

2. The method of transferring a generator from one circuit to another of different potential, which consists in connecting it to the new circuit through a source of electromotive force while maintaining its connection with the old circuit also through a source of electromotive force, and varying the relative values of such electromotive forces until the potential of the new circuit is reached or substantially reached, and then completing the transfer, as described.

3. An apparatus for transferring electrical apparatus from a circuit at one potential to a different circuit at another potential, consisting in the combination with an electrical apparatus of switches adapted to connect the electrical apparatus with either of said circuits, dynamo-electric machines arranged intermediate to, and connecting said electrical apparatus with said different circuits, resistances in the field-circuits of said dynamo-electric machines, and a switch mechanism for actuating the resistances inversely, whereby the relative values of the intermediate electromotive forces are regulated, for the purpose set forth.

In witness whereof I have hereunto set my hand this 22d day of December, 1894.

JAMES BURKE.

Witnesses:
  B. B. HULL,
  GENEVIEVE HAYNES.